March 17, 1931. W. W. TRUXELL 1,796,673
ROLLER
Filed Aug. 7, 1929
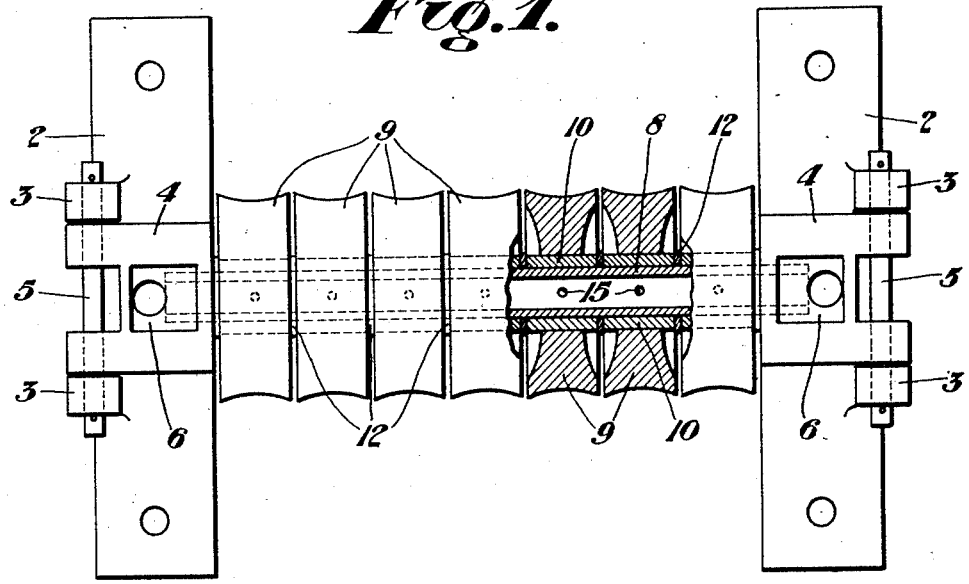
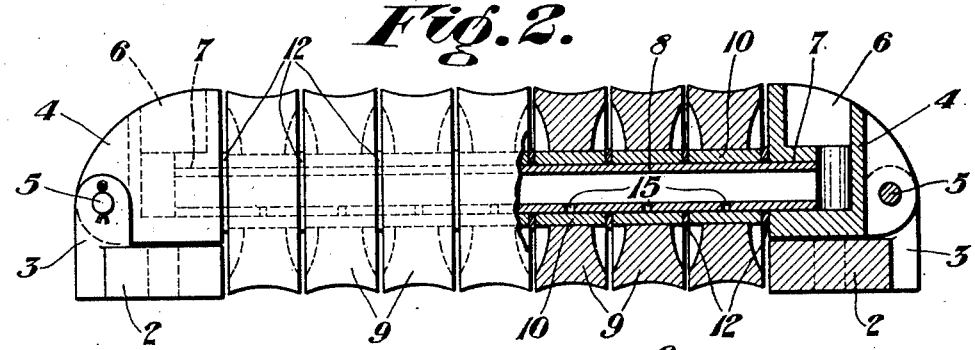
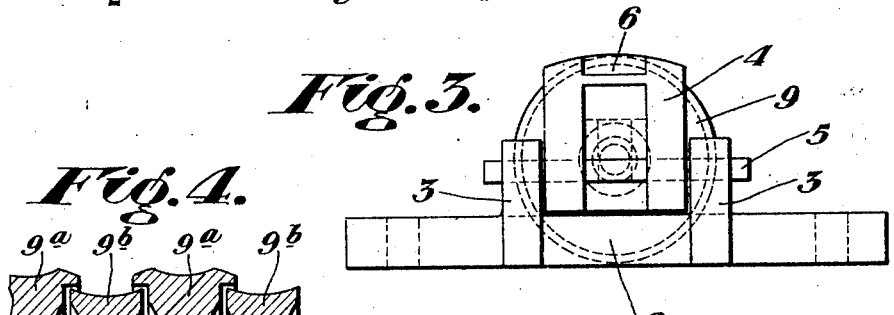
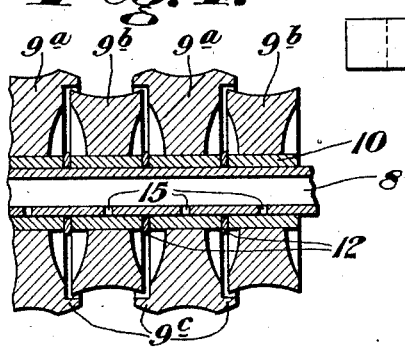
Inventor:
WHITELY W. TRUXELL,
by R. D. Little
his Attorney Patented Mar. 17, 1931

1,796,673

UNITED STATES PATENT OFFICE

WHITELY W. TRUXELL, OF GREENSBURG, PENNSYLVANIA

ROLLER

Application filed August 7, 1929. Serial No. 384,189.

This invention relates to an improved roller construction for supporting haulage ropes or cables and the like, and more particularly to return rollers, and has for its object the provision of a roller of this class having a readily removable sectional roller member composed of a plurality of sheave wheel segments which are removable and interchangeable.

Another object is to provide a roller of this class which has improved lubricating means whereby the roller segments may be readily lubricated.

A further object is to provide a roller of this class which is of generally improved construction and more efficient than the rollers of the prior art.

In the drawings—

Figure 1 is a plan view of a roller constructed in accordance with this invention.

Figure 2 is a front side elevation thereof.

Figure 3 is an end elevation thereof.

Figure 4 is a sectional plan showing a modified construction embodying my invention.

Referring more particularly to the drawings, the numeral 2 designates the base members, two of which are provided and adapted to be spiked or otherwise secured to the ties of a mine track or other structure. The base members 2 are provided with integral ears 3 projecting upwardly from adjacent the outer top edge of the members and spaced apart to form mountings for bearing blocks 4.

The bearing blocks 4 are mounted between the ears 3 and removably hinged to said ears by hinge-pins 5 which pass through the ears 3 and apertures in said blocks.

Each of the bearing blocks is provided with a lubricant well or reservoir 6 opening downward from its top face, and also with a bearing aperture 7 which extends inwardly from the inner side faces of the block and intersects the well 6.

A hollow shaft 8 is journaled in the bearing apertures 7 of the blocks 4 and serves to support a series of sheave-like grooved rollers 9 which are journaled thereon. The rollers 9 may be formed in one piece with an integral hub or may be provided with a brass bushing 10, as shown, which forms the hub.

For ordinary return roller work the rollers 9 will be separated from each other and from the bearing blocks by separator or bearing disk members 12.

It will be understood, however, that when desirable, as when the roller is to be mounted in a vertical or inclined position for guiding a rope or cable around a curve, anti-friction thrust bearings may be substituted for the disk members 12. It also will be understood that when it is desired to reduce the friction to a minimum, anti-friction sleeve bearings may be substituted for the bushings 10.

The hollow shaft 8 is provided with holes 15 in its side walls at spaced intervals so as to be located under the rollers 9 and said holes are adapted to permit the lubricant, which flows from the wells or reservoirs 7 through the hollow shaft 8, to flow under and lubricate the rollers 9.

In operation, the roller assembly is mounted in operative position by spiking or otherwise securing it to a suitable base such as the ties of a mine track, the lubricant wells 6 are filled with lubricant and may be packed with waste or other absorbent material if desired.

While the roller is in use, if one of the sheave rollers 9 becomes worn or broken, it is only necessary to remove one of the pins 5 and withdraw one of the bearing blocks 4, then the shaft 8 may be swung up on an angle and the rollers removed until the worn roller is reached. The worn roller may then be replaced by a new one or exchanged with one of the unworn rollers so as to provide a new roller at the point of wear. If desired, the rollers 9 may be interchanged with each other at frequent intervals so as to provide a more or less even wear over the entire roller assembly.

Heretofore, return rollers have generally been made in one piece and, therefore, when a groove was worn in the roller the entire roller had to be replaced. In the present construction the life of the roller assembly is increased by the number of the rollers 9 there are on the shaft 8, since each roller offers a new or individual wear surface.

The wear on the rollers 9 is materially less than on the one-piece prior art rollers, due to the fact that the rollers 9 are of materially less weight and also are better lubricated so that they will rotate with less effort.

In Figure 4 I have shown a modified roller construction in which alternate rollers 9ª are slightly larger in diameter than the other rollers 9ᵇ and are provided with flanges 9ᶜ which overlap the rollers 9ᵇ and prevent the rope or cable from cutting in between the several rollers.

While I have shown and described certain specific embodiments of my invention it will be understood that I do not wish to be limited thereto since various modifications may be made without departing from the scope of my invention, as defined in the appended claims.

I claim—

1. A multiple sheave roller comprising a pair of base members, upwardly extending spaced ears on said base members, bearing blocks mounted between each of said pairs of ears and hingedly secured thereto, said blocks each being provided with lubricant containing wells extending downwardly from the top wall thereof and bearing openings extending inwardly from the inner side walls thereof and intersecting said lubricant wells, a hollow shaft journaled in said bearing openings in said blocks, a plurality of sheave rollers journaled on said shaft, and spacing disks between said rollers and between the end rollers and said bearing blocks.

2. A multiple sheave roller comprising a pair of base members, upwardly extending spaced ears formed integral with said base members, bearing blocks mounted between each of said pairs of ears and hingedly secured thereto, said blocks each being provided with lubricant containing wells extending downwardly from the top wall thereof and bearing openings extending inwardly from the inner side walls thereof and intersecting said lubricant wells, a hollow shaft journaled in said bearing openings in said blocks, a plurality of sheave rollers journaled on said shaft, said shaft being provided with openings spaced along its length through which lubricant may pass from said wells to said rollers, and means for reducing the friction between said rollers.

3. A slope roller comprising a pair of one-piece base members adapted to be spiked or otherwise secured to the ties of a track structure, a pair of upwardly extending spaced ears formed integral with each of said base members, a shaft removably mounted in said ears and normally held against all but rotary movement, a bearing block journaled on each of said shafts between said ears, a shaft journaled in said bearing blocks, and a plurality of sheave rollers journaled on said shaft.

4. A slope roller comprising a pair of one-piece base members adapted to be spiked or otherwise secured to the ties of a track structure, a pair of upwardly extending spaced ears formed integral with each of said base members, a shaft removably mounted in said ears and normally held against all but rotary movement, a bearing block journaled on each of said shafts between said ears, a hollow shaft journaled in said bearing blocks, wells for supplying lubricant to said bearing blocks and said hollow shaft, a plurality of sheave rollers journaled on said hollow shaft, said hollow shaft being provided with openings spaced along its length through which lubricant may pass from said wells to said rollers, and spacing disks between said rollers and between the end rollers and said bearing blocks.

In testimony whereof, I have hereunto set my hand.

WHITELY W. TRUXELL.